United States Patent
Ke

(10) Patent No.: US 11,860,669 B2
(45) Date of Patent: Jan. 2, 2024

(54) METHOD AND APPARATUS AND COMPUTER PROGRAM PRODUCT FOR STORING DATA IN FLASH MEMORY

(71) Applicant: Silicon Motion, Inc., Zhubei (TW)

(72) Inventor: Kuan-Yu Ke, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 17/157,368

(22) Filed: Jan. 25, 2021

(65) Prior Publication Data

US 2022/0100373 A1 Mar. 31, 2022

(30) Foreign Application Priority Data

Sep. 29, 2020 (CN) .......................... 202011056071.5

(51) Int. Cl.
*G06F 3/06* (2006.01)
*G06F 11/07* (2006.01)

(52) U.S. Cl.
CPC ............ *G06F 3/064* (2013.01); *G06F 3/0619* (2013.01); *G06F 3/0644* (2013.01); *G06F 3/0679* (2013.01); *G06F 11/076* (2013.01)

(58) Field of Classification Search
USPC ......................................................... 711/154
See application file for complete search history.

(56) References Cited

U.S. PATENT DOCUMENTS

| | | | | |
|---|---|---|---|---|
| 8,458,417 B2* | 6/2013 | Goss | ................... | G06F 12/0246 711/170 |
| 10,854,290 B1* | 12/2020 | Wu | ...................... | G11C 11/5628 |
| 2011/0099458 A1* | 4/2011 | Reche | ................. | G06F 11/1048 714/763 |
| 2011/0219180 A1* | 9/2011 | Cheon | ................... | G06F 3/0679 711/E12.008 |

(Continued)

FOREIGN PATENT DOCUMENTS

| | | | |
|---|---|---|---|
| CN | 110427158 A | * | 11/2019 |
| TW | I692762 B | | 5/2020 |
| TW | I719494 B | | 2/2021 |

OTHER PUBLICATIONS

English translation of Taiwanese Search Report for Taiwanese Application No. 109133806, dated Aug. 27, 2021.

*Primary Examiner* — Yaima Rigol
*Assistant Examiner* — Elias Young Kim
(74) *Attorney, Agent, or Firm* — Birch, Stewart, Kolasch & Birch, LLP

(57) ABSTRACT

The invention introduces a method, an apparatus and a non-transitory computer program product for storing data in flash memory. The method is performed by a processing unit when loading and executing program code of a flash translation layer to include: dividing storage space of a flash module into a first region and a second region; programming data belonging to a first partition type received from a host side into first physical blocks of the first region only; and programming data belonging to a second partition type received from the host side into the first physical blocks of (Continued)

the first region and the second physical blocks of the second region. With the region division and the policy for writing data into the regions in terms of data characteristics of different partition types, storage space of the flash module would be used more effective.

17 Claims, 9 Drawing Sheets

(56) References Cited

U.S. PATENT DOCUMENTS

| | | | | |
|---|---|---|---|---|
| 2011/0252187 A1* | 10/2011 | Segal | ................. | G06F 12/0246 |
| | | | | 711/E12.008 |
| 2012/0005415 A1* | 1/2012 | Jung | ................. | G06F 12/0246 |
| | | | | 711/E12.008 |
| 2013/0265825 A1* | 10/2013 | Lassa | ................. | G06F 3/0655 |
| | | | | 365/185.11 |
| 2014/0067984 A1 | 3/2014 | Danilak | | |
| 2015/0193339 A1 | 7/2015 | Kim et al. | | |
| 2015/0199268 A1* | 7/2015 | Davis | ................. | G06F 12/0246 |
| | | | | 711/103 |
| 2016/0092129 A1* | 3/2016 | Agarwal | ................. | G11C 29/52 |
| | | | | 714/764 |
| 2016/0124806 A1* | 5/2016 | Yen | ................. | G06F 11/1068 |
| | | | | 714/764 |
| 2016/0232983 A1* | 8/2016 | Khurana | ................. | G11C 11/56 |
| 2016/0253257 A1* | 9/2016 | Kim | ................. | G06F 3/0679 |
| | | | | 711/166 |
| 2016/0357437 A1* | 12/2016 | Doerner | ................. | G06F 3/0613 |
| 2016/0357480 A1* | 12/2016 | Choi | ................. | G06F 3/061 |
| 2017/0024137 A1* | 1/2017 | Kanno | ................. | G06F 3/0679 |
| 2018/0136878 A1* | 5/2018 | Madpur | ................. | G11C 7/10 |
| 2018/0260331 A1* | 9/2018 | Kotte | ................. | G06F 11/1048 |
| 2019/0187900 A1* | 6/2019 | Byun | ................. | G06F 3/061 |
| 2019/0310794 A1* | 10/2019 | Eom | ................. | G06F 3/0656 |
| 2020/0026475 A1 | 1/2020 | Yang | | |
| 2020/0097211 A1* | 3/2020 | Alsasua | ................. | G06F 3/0604 |
| 2020/0218468 A1 | 7/2020 | Hsu | | |

* cited by examiner

METHOD AND APPARATUS AND COMPUTER PROGRAM PRODUCT FOR STORING DATA IN FLASH MEMORY

CROSS-REFERENCE TO RELATED APPLICATIONS

This application claims the benefit of Patent Application No. 202011056071.5, filed in China on Sep. 29, 2020; the entirety of which is incorporated herein by reference for all purposes.

BACKGROUND

The disclosure generally relates to storage devices and, more particularly, to a method, an apparatus and a computer program product for storing data in flash memory.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

Effective use of NAND flash memory space to store different types of host data has always been an important issue in flash controllers. Thus, it is desirable to have a method, an apparatus and a computer program product for storing data in flash memory, which are suitable for different types of host data.

SUMMARY

In an aspect of the invention, an embodiment introduces a method for storing data in flash memory, performed by a processing unit when loading and executing program code of firmware translation layer (FTL), to include: dividing storage space in a flash module into a first region and a second region; programming data belonging to a first partition type, which is received from a host side, into the first physical block in the first region only; and programming data belonging to a second partition type, which is received from the host side, into the first physical block in the first region and the second physical block in the second region.

In another aspect of the invention, an embodiment introduces a non-transitory computer program product for storing data in flash memory when executed by a processing unit. The non-transitory computer program product includes program code of FTL when being executed to realize the operations recited the aforementioned method.

In still another aspect of the invention, an embodiment introduces an apparatus for storing data in flash memory, at least including: a flash interface (I/F), coupled to a flash module; a host I/F, coupled to a host side; and a processing unit, coupled to the flash I/F and the host I/F. The processing unit is arranged operably to divide storage space in a flash module into a first region and a second region; program data belonging to a first partition type, which is received from a host side, into the first physical block in the first region only; and program data belonging to a second partition type, which is received from the host side, into the first physical block in the first region and the second physical block in the second region The first region includes multiple first physical blocks, the second region includes multiple second physical block, each first physical block is programmed in a single level cell (SLC) mode only, each second physical block is programmed in the SLC mode or a non-SLC mode, the SLC mode is used to program a memory cell to store one of two states, and the non-SLC mode is used to program a memory cell to store one of at least four states.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
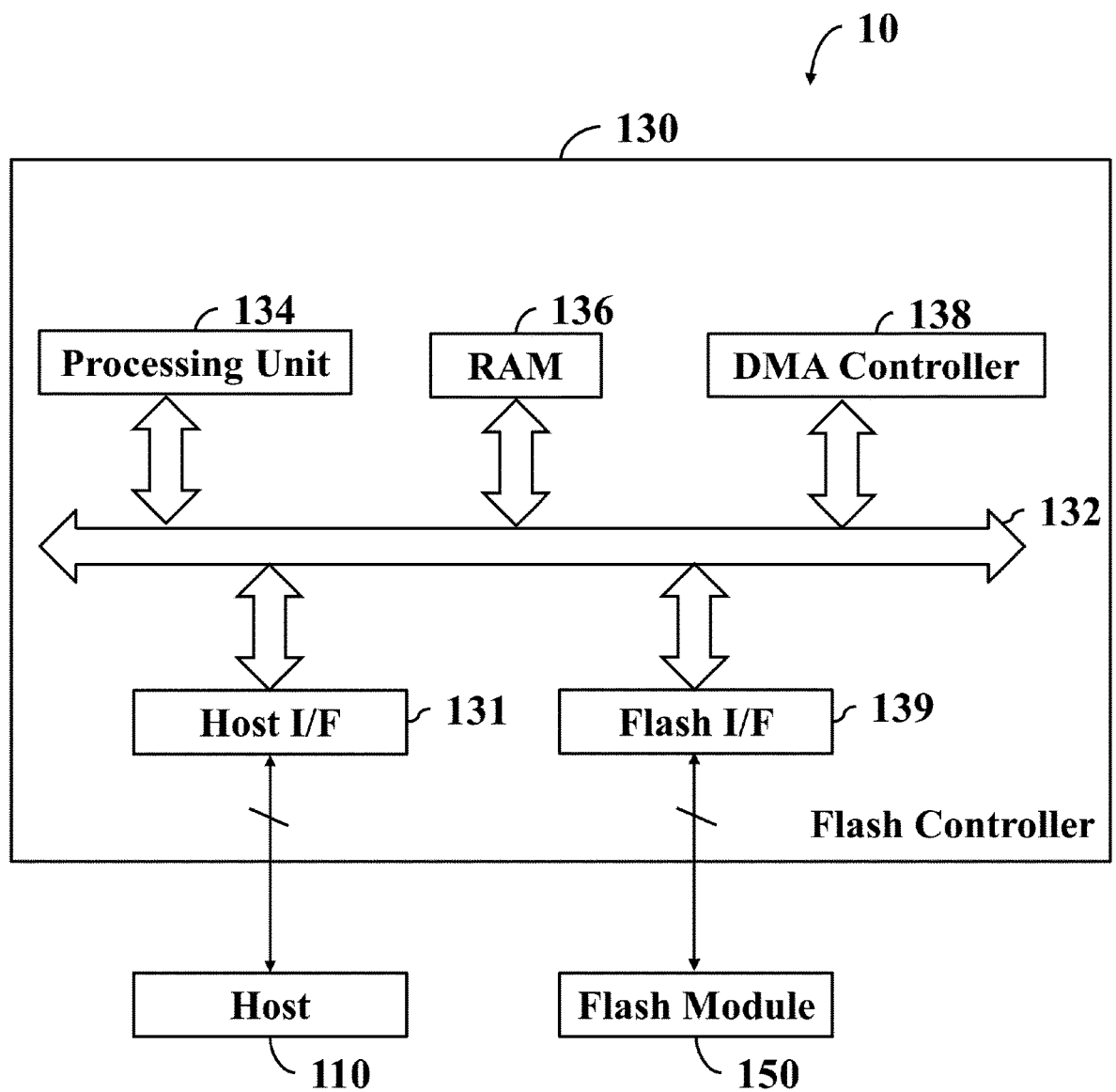
FIG. 1 is the system architecture of an electronic apparatus according to an embodiment of the invention.

Refer to FIG. 1. The electronic apparatus 10 includes a host side 110, a flash controller 130 and a flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and the host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a single processor, multiple processors or graphics processing units capable of parallel computations, or others) that is programmed using firmware and/or software instructions to perform the functions recited herein. The processing unit 134 may receive host commands from the host side 110 through the host I/F 131, such as read commands, write commands, erase commands, etc., schedule and execute the host commands. The flash controller 130 includes the Random Access Memory (RAM) 135, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-to-flash (H2F) tables, flash-to-host (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136, the direct memory access (DMA) controller 138 and the flash I/F 139. The DMA controller 138 moves data between the components through the bus architecture 132 according to the instructions issued by the processing unit 134. For example, the DMA controller 138 may migrate data in a specific data buffer of the host I/F 131 or the flash I/F 139 to a specific address of the RAM 136, migrate data in a specific address of the RAM 136 to a specific data buffer of the host I/F 131 or the flash I/F 139, and so on.

The flash module 150 provides huge storage space typically in hundred Gigabytes (GBs), or even several Terabytes (TBs), for storing a wide range of user data, such as high-resolution images, video files, etc. The flash module 150 includes control circuits and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
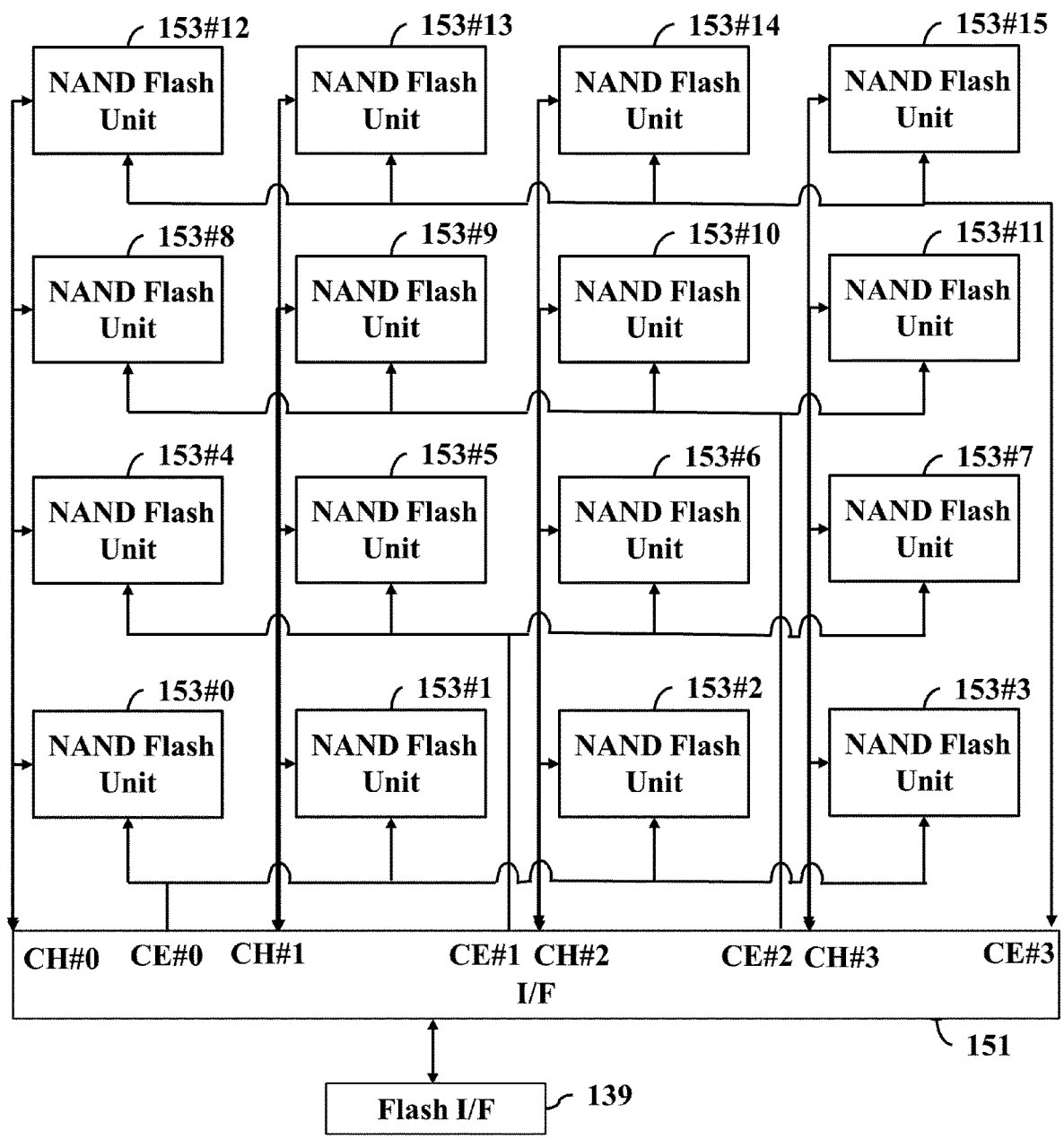
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash modules 153 #0 to 153 #3, the NAND flash modules 153 #4 to 153 #7, the NAND flash modules 153 #8 to 153 #11, or the NAND flash modules 153 #12 to 153 #15, and read data from or program data into the activated NAND flash modules in parallel.

In order to store different types of host data, each of the NAND flash units 153 #0 to 153 #15 contains physical blocks and each physical block may be configured as an SLC or a non-SLC block. All SLC blocks of the NAND flash units 153 #0 to 153 #15 are collected as an SLC region and the other blocks thereof are collected as a non-SLC region. Each memory unit of the SLC block after being erased can be programmed in the SLC mode only and each memory unit of the non-SLC block after being erased can be programmed in the SLC, MLC, TLC or QLC mode. The MLC, TLC and QLC modes may be referred to as non-SLC modes collectively. Each MLC, TLC or QLC can store more bits of data than one SLC, but the data retention and the access speed of SLC is better than that of MLC, TLC or QLC. Each memory unit in the SLC block, the MLC block, the TLC block and the QLC block can store one of two, four, eight and sixteen states, respectively. Each word line in the SLC block may store one page of data. Each word line in the MLC block may store two pages of data, which includes one most significant bit (MSB) page and one least significant bit (LSB) page. Each word line in the TLC block may store three pages of data, which includes one MSB page, one center significant bit (CSB) page and one LSB page. Each word line in the QLC block may store four pages of data, which includes one top significant bit (TSB) page, one MSB page, one CSB page and one LSB page.

Figure 3:
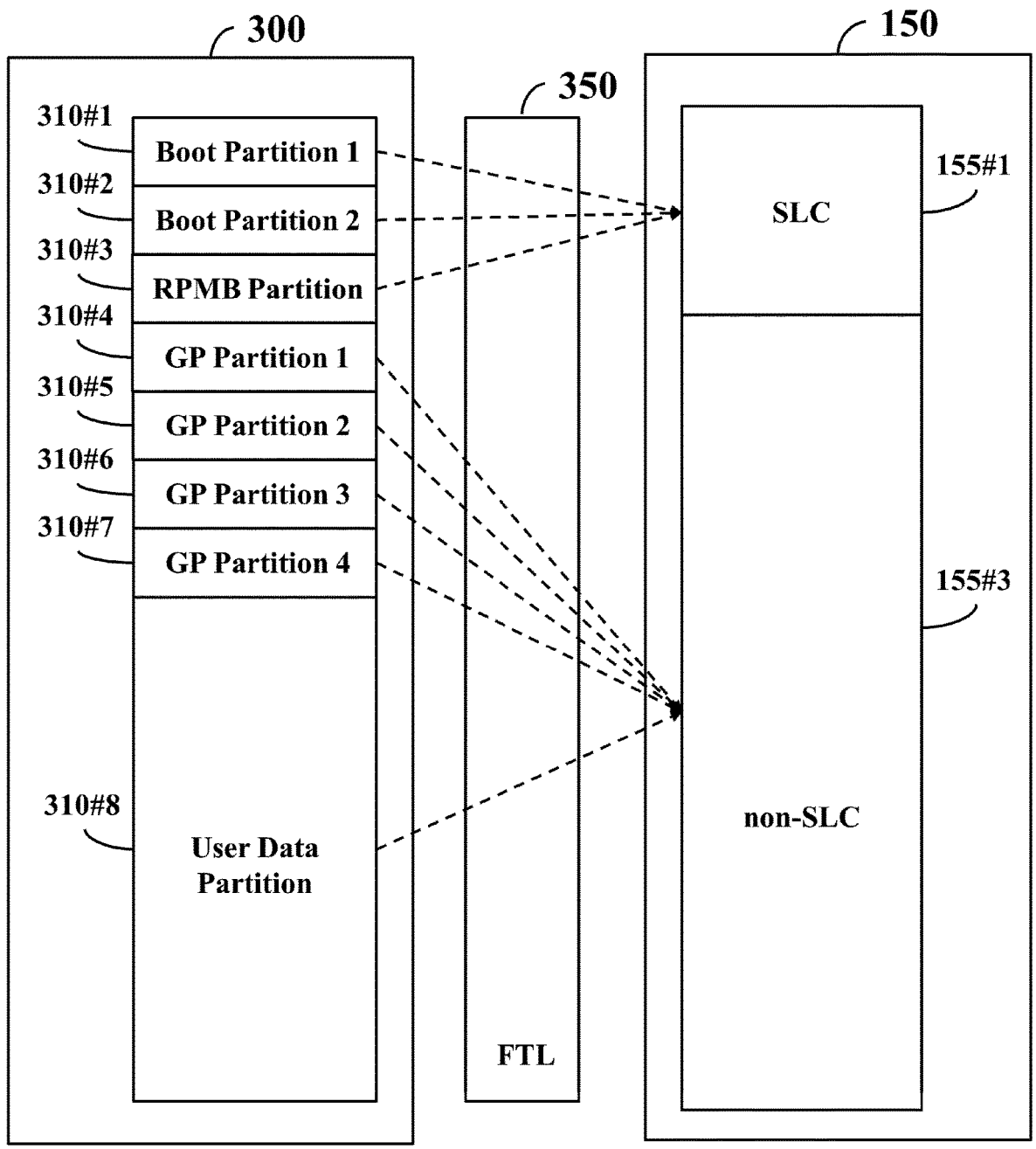
FIG. 3 is a schematic diagram for mapping host partitions to storage regions according to some implementations.

Refer to FIG. 3. The host side 110 runs the file system 300 to realize operations for, such as data storage, hierarchical organization, data access, etc. For example, the file system 300 may divide the storage space provided by the device side into the boot partitions 310 #1 and 310 #2, the replay protected memory block (RPMB) partition 310 #3, the general purpose (GP) partitions 310 #4 to 310 #7, and the user data partition 310 #8 logically. The file system 300 sends the logical partitioning information to the flash translation layer (FTL) run on the flash controller 130, which includes the number, the length for each partition, and the partition length is usually represented by a quantity of logical block address (LBA) numbers. One LBA number corresponds to the fixed-length of data, such as 512 bytes, etc. The host side 110 may store system configurations and boot program in the boot partition 310 #1, and the drivers and the operating system (OS) in the boot partition 310 #2 via the file system 300. The host side 110 may additionally store a wide range of applications in the GP partitions 310 #4 to 310 #7, and a wide range of data files in the user data partition 310 #8. For example, when attempting to write the boot program into the device side, the host side 110 issues host write commands to the flash controller 130, individually including information about the number of the boot partition 310 #1, a start LBA number, a length, etc. When attempting to write a video stream file into the device side, the host side 110 issues host write commands to the flash controller 130, individually including information about the number of the user data partition 310 #8, a start LBA number, a length, etc. In order to facilitate management, in some implementations, the FTL 350 allows data of the designated portion of partitions to be stored in the SLC region 155 #1 and data of the other partitions to be stored in the non-SLC region 155 #3 according to the characteristics of the host data. The FTL 350 may program data received from the host side into one or more physical blocks into the SLC region 155 #1 or the non-SLC region 155 #3 in the flash module 150 according to the partition number carried in each host write commands. Specifically, the FTL 350 programs data corresponding to the boot partitions 310 #1 and 310 #2 and the RPMB partition 310 #3 into the SLC region 155 #1, and programs data corresponding to the GP partitions 310 #4 to 310 #7 and the user data partition 310 #8 into the non-SLC region 155 #3. Thus, the SLC blocks are used to store important, error-free, and frequently accessed system data, such as the OS, the drivers, keys etc. The non-SLC blocks are used to store large system data and user data, such as various application, word processing, spreadsheet, presentation, image, audio, video files, and other data files.

Usually at the beginning, the FTL 350 allocates storage space exceeding the length of the boot partitions 310 #1 and 310 #2 and the RPMB partition 310 #3 to the SLC region 155 #1. For example, although the logical partitioning information indicates that the length of the boot partitions 310 #1 and 310 #2 and the RPMB partition 310 #3 is 8 megabytes (8 MB), the FTL 350 allocates 10 MB of storage space to the SLC region 155 #1. However, since the data of the boot partitions 310 #1 and 310 #2 and the RPMB partition 310 #3 are typically rarely changed, the SLC region 155 #1 has a lot of space that would not be used. Even the space of non-SLC region 155 #3 is about to be filled with the data of the GP partitions 310 #4 to 310 #7 and the user data partition 310 #8 fully, the free space in the SLC region 155 #1 still cannot be used.

Figure 4:
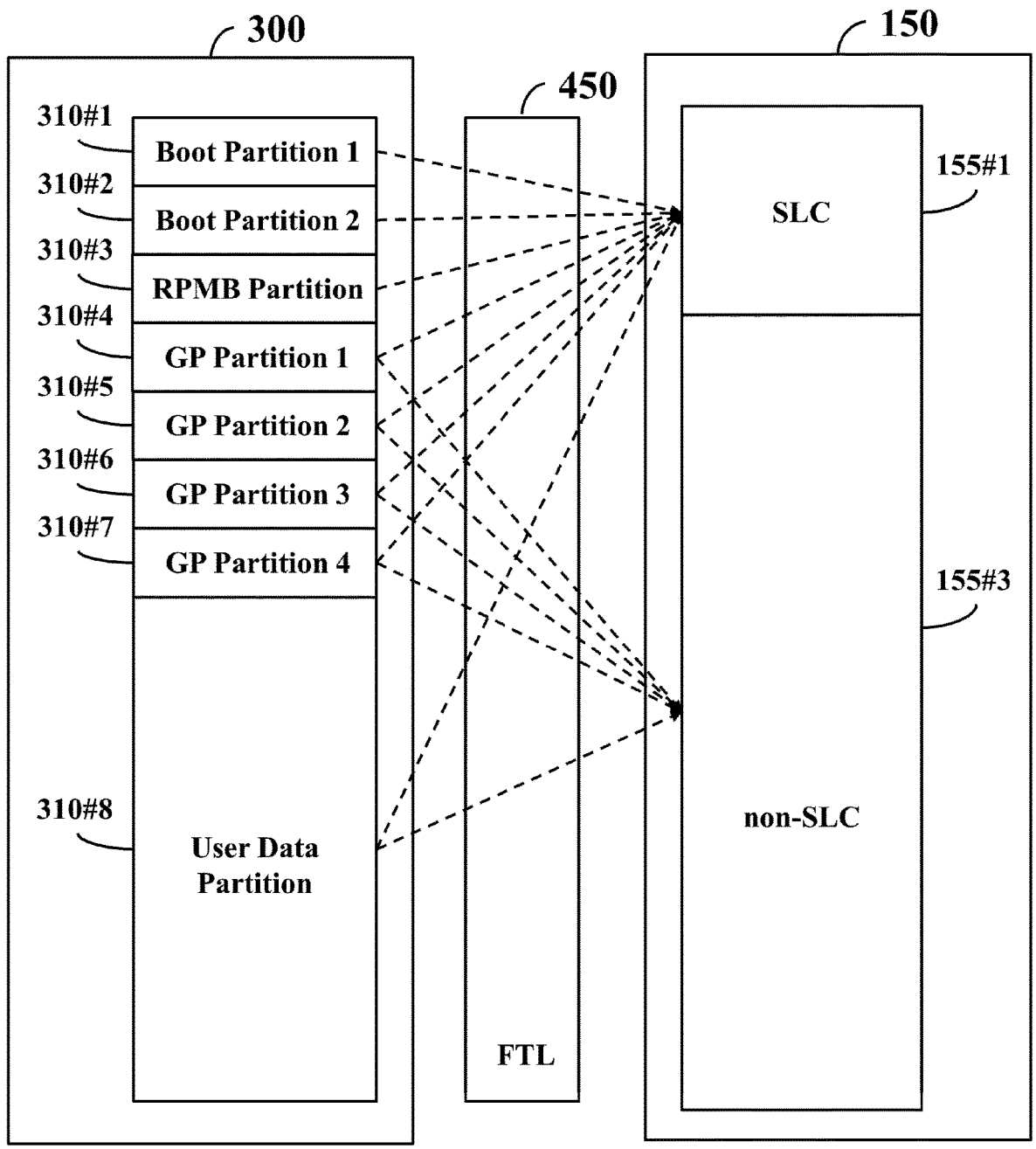
FIG. 4 is a schematic diagram for mapping host partitions to storage regions according to an embodiment of the invention.

An embodiment of the invention proposes a novel allocation policy for more effectively using the storage space of the flash module 150. Refer to FIG. 4. The FTL 450 may allow data of the designated portion of partitions to be stored in the SLC region 155 #1 and data of the other partitions to be stored in the SLC region 155 #1 or the non-SLC region 155 #3 according to the characteristics of the host data. For example, the FTL 450 programs data corresponding to the boot partitions 310 #1 and 310 #2 and the RPMB partition 310 #3 into the SLC region 155 #1, and programs data corresponding to the GP partitions 310 #4 to 310 #7 and the user data partition 310 #8 into the SLC region 155 #1 or the non-SLC region 155 #3. Specifically, a method for storing data in flash memory, which is performed by the processing unit 134 when loading the executing the FTL 450, includes: dividing the storage space of the flash module 150 into the SLC region 155 #1 and the non-SLC region 155 #3; driving the flash I/F 139 to program data received from the host side 110 through the host I/F 131, which belongs to the boot partitions 310 #1 and 310 #2 and the RPMB partition 310 #3 into the physical blocks in the SLC region 155 #1 only; and driving the flash I/F 139 to program data received from the host side 110 through the host I/F 131, which belongs to the GP partitions 310 #4 to 310 #7 and the user data partition 310 #8 into the physical blocks in the SLC region 155 #1 and the non-SLC region 155 #3.

Figure 5:
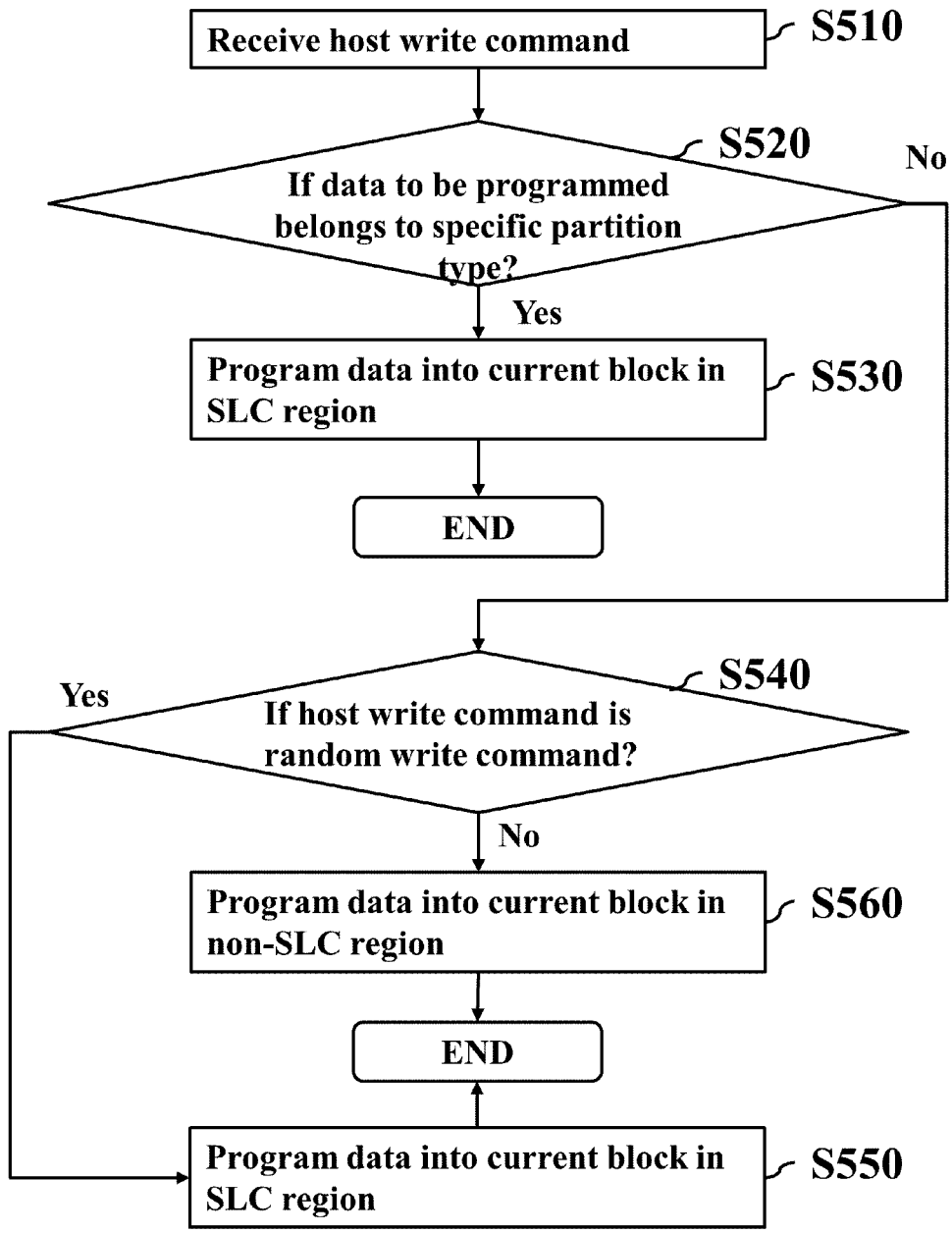
FIG. 5 is a flowchart illustrating a method for programming data according to an embodiment of the invention.

In some embodiments, the FTL 450 may allow random data corresponding to the GP partitions 310 #4 to 310 #7 and the user data partition 310 #8 to be stored in the SLC region 155 #1 and continuous data corresponding to the GP partitions 310 #4 to 310 #7 and the user data partition 310 #8 to be stored in the non-SLC region 155 #3. Refer to FIG. 5 showing the flowchart of a method for storing data, which is performed by the processing unit 134 when loading and executing program code of the FTL 450. Details are described as follows:

Step S510: A host write command is received from the host side 110 through the host I/F 131.

Step S520: It is determined whether data to be programmed belongs to the specific partition type. If so, the process proceeds to step S530. Otherwise, the process proceeds to step S540. For example, the FTL 450 divides all partitions into two types: the first partition type includes the boot partitions 310 #1 and 310 #2 and the RPMB partition 310 #3; and the second partition type includes the GP partitions 310 #4 to 310 #7 and the user data partition 310 #8. The specific partition type as described above is defined as the first partition type. The processing unit 134 may complete the judgment by examining the partition number carried in the host write command.

Step S530: The data is programmed into one or more physical pages of the current block in the SLC region 155 #1. Each physical block in the SLC region 155 #1 may be labeled as a spare block, a current block or a data block. Any physical block containing no valid data is the spare block. For each NAND flash unit, the flash controller 130 may select one physical block from the spare blocks of each data plane as the current block used to program data requested by the host write command. After the current block is full of data, the flash controller 130 closes this physical block to be read-only, and the closed physical block is called the data block. Subsequently, the flash controller 130 selects one from the spare blocks as a new current block to continue data programming. The FTL 450 may maintain a physical-to-logical mapping (P2L) table for each current block in the RAM 136 for recording information indicating which LBA number that the data stored in each physical page of the current block belongs to in the order of physical pages. Once the current block is closed and becomes the data block, the FTL 450 may drive the flash I/F 139 to program the corresponding P2L table into a designated location in the flash module 150. Additionally, the FTL 450 may update the corresponding content of the logical-to-physical mapping (L2P) table. The L2P table records information indicating which physical address that the data of each LBA number is physically stored in the order of LBA numbers. The physical address may include a physical-block number, a physical-page number, and others. The FTL 450 may change the physical address in the L2P table, which corresponds to each LBA number with data that has been programmed, to point to the designated location in the SLC region 155 #1.

It is to be noted that each LBA number in the L2P table is mapped to one partition number to indicate that this LBA number belongs to which partition. Additionally, each physical address in the L2P table belongs to the SLC region 155 #1 or the non-SLC region 155 #3 in light of the initial configurations. In some embodiments, the FTL 450 may scan physical addresses for the LBA numbers that belong to the GP partitions 314 #4 to 310 #7 and the user data partition 310 #8 in the L2P table to know that the data of each belonged LBA number is physically stored in the SLC region 155 #1 or the non-SLC region 155 #3.

In some embodiments, in order to distinguish which partition type the data of each physical page of each current or data block in the SLC region 155 #1 belongs to, the FTL 450 may further maintain a partition-type bit table for each current or data block in the RAM 136, in which any bit being "1" represents that the data stored in the corresponding physical page belongs to the second partition type and any bit being "0" represents that the data stored in the corresponding physical page belongs to the first partition type. A total number of bits in the partition-type bit table is equal to or greater than a total number of physical pages in one physical block. After the data has been programmed into one physical page in the SLC region 155 #1, the FTL 450 updates the bit value in the partition-type bit table, which corresponds to the programmed physical page, with "0".

Step S540: It is determined whether the host write command is a random write command. If so, the process proceeds to step S550. Otherwise, the process proceeds to step S560. The FTL 450 may make the judgement according to the data length requested by the host write command. Assume that the minimum data unit managed by the host side 110 is 4 kilobytes (4 KB) and the length of one physical page is 16 KB: When the host write command requests to write data shorter than 16 KB, the FTL 450 determines that the host write command is a random write command. Otherwise, the host write command is determined as a continuous write command. This host write command may be combined with the previous and/or subsequent host write commands to request to write long data.

Step S550: The data is programmed into one physical page of the current block in the SLC region 155 #1. Regarding the technical details of updating the P2L table and the L2P table after programming the data, those artisans may infer them from the description of step S530, and will not be repeated for brevity. In some embodiments, the FTL 450 may update the bit value in the partition-type bit table, which corresponds to the programmed physical page, with "1" to indicate that the data of this physical page belongs to the second partition type.

Step S560: The data is programmed into one or more physical pages of the current block in the non-SLC region 155 #3. Similarly, each physical block in the non-SLC region 155 #3 may be labeled as one of three states: the spare block; the current block; and the data block. Regarding the technical details of changing the state of each physical block in the non-SLC region 155 #3, those artisans may infer them from the description of step S530, and will not be repeated for brevity. Moreover, regarding the technical details of updating the P2L table and the L2P table after programming the data into the non-SLC region 155 #3, those artisans may infer them from the description of step S530, and will not be repeated for brevity.

It is to be noted that the data programming operations recited in steps S530, S550 and S560 may not necessarily drive the flash I/F 139 to program data into the flash module 150 immediately, but store one or more relevant write instruction in the queue of the flash I/F 139. Then, the flash I/F 139 determines the execution timing of these write instructions and the invention should not be limited thereto.

After the flash module 150 is manipulated for a period of time, the number of spare blocks in the SLC region 155 #1 will change. The FTL 450 may maintain a spare counter to indicate a total number of spare blocks in the SLC region 155 #1 currently. Once one spare block in the SLC region 155 #1 is changed to be a current block, the spare counter is decreased by one. Once one data block in the SLC region 155 #1 is changed to be a spare block, the spare counter is increased by one. Furthermore, after the data access to the flash module 150 for a period of time, many physical pages in the SLC region 155 #1 may contain valid sectors and invalid sectors (also called expired sectors) individually. The valid sector stores valid data and the invalid sector stores invalid (old) data. When detecting that the spare counter value is lower than the threshold, the FTL 450 reads and collects the data of valid sectors of the data blocks in the SLC region 155 #1, which belongs to the second partition type, and then, drives the flash I/F 139 to program the collected valid data into one or more empty physical pages of the current block in the non-SLC region 155 #3 in the MLC, TLC or QLC mode. Additionally, the FTL 450 reads and collects the data of valid sectors of the data blocks in the SLC region 155 #1, which belongs to the first partition type, and then, drives the flash I/F 139 to program the collected valid data into one or more empty physical pages of the current block in the SLC region 155 #1 in the SLC mode. As a result, the data blocks containing invalid data only (that is, the spare blocks) in the SLC region 155 #1 can be used for other data after being erased. The detailed operations described above is referred to as a cross-region garbage collection (GC) process. It is to be noted that, when programming valid data into the physical pages in the non-SLC region 155 #3 in the MLC, TLC or QLC mode, the cross-region GC process releases storage space of two or more physical pages (i.e. SLC pages) in the SLC region 155 #1. In the cross-region GC process, the FTL 450 updates the content of P2L and L2P tables according to the execution results of programming operations.

Figure 6:
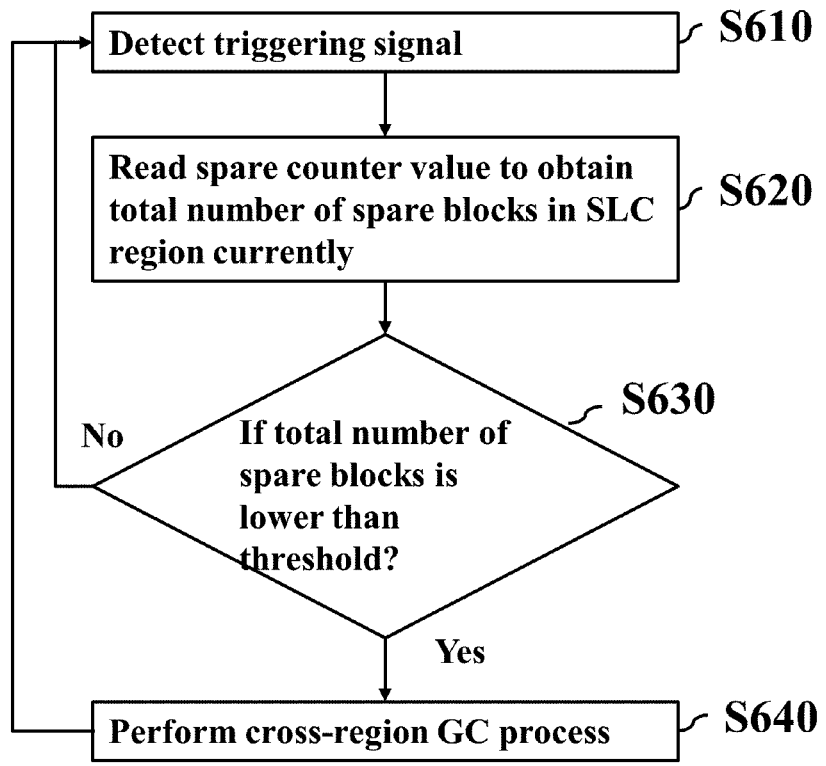
FIG. 6 is a flowchart illustrating a method for organizing storage space according to an embodiment of the invention.

Refer to FIG. 6 showing the flowchart of a method for organizing storage space, performed by the processing unit 134 when loading and executing program code of the FTL 450. Details are described as follows:

Step S610: A triggering signal is detected. The triggering signal may indicate that the device side is going to enter the sleep mode, it has reached the preset time point, a host write command is received, or other preset condition has been met.

Step S620: The spare counter value is read to obtain a total number of spare blocks in the SLC region 155 #1 currently.

Step S630: It is determined whether the total number of spare blocks is lower than the threshold. If so, the process proceeds to step S640. Otherwise, the process proceeds to step S610.

Step S640: The aforementioned cross-region GC process is performed.

In some embodiments of the cross-region GC process, in order to determine whether data stored in each physical page of a data block in the SLC region 155 #1 belongs to the first partition type or the second partition type, the FTL 450 may search the partition-type bit table corresponding to this data block to obtain the above information. For example, if the bit corresponding to a data block in the partition-type bit table is "1", it means the data of the corresponding physical page belongs to the second partition type, and the FTL 450 may collect valid data from the corresponding physical page.

In alternative embodiments, the FTL 450 may search the physical addresses corresponding to the LBA numbers that belongs to the second partition type in the L2P table to determine which LBA numbers of data are stored in the SLC region 155 #1, and collect valid data from the physical addresses of the SLC region 155 #1, which meet the above requirement.

Figure 7:
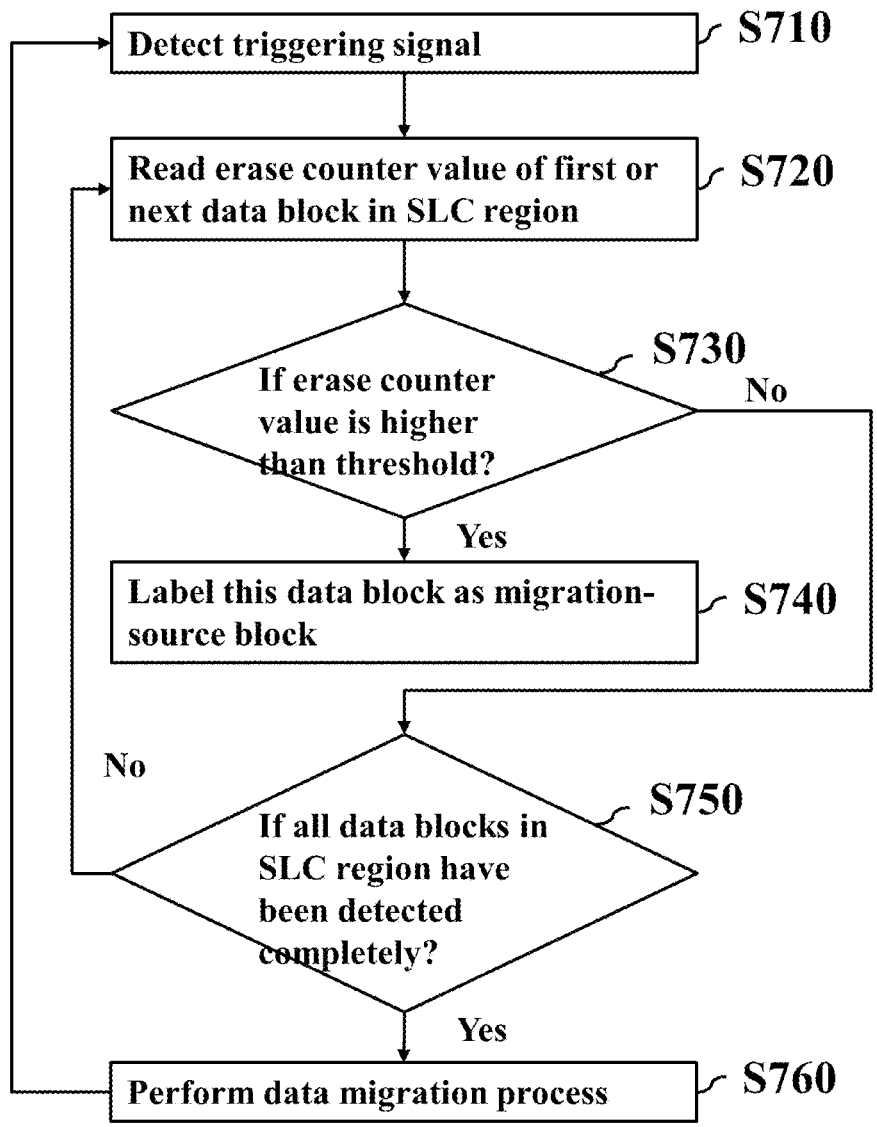
FIG. 7 is a flowchart illustrating a method for cross-region wear leveling according to an embodiment of the invention.

In order to make the physical blocks in the SLC region 155 #1 to have a similar degree of wear and prolong their usage life, the FTL 450 may perform a data migration procedure at proper time points. The FTL 450 may provide an erase counter for each physical block, being set to zero initially. After erasing a physical block each time, the corresponding erase counter is increased by one. Refer to FIG. 7 showing the flowchart of a method for cross-region wear leveling, which is performed by the processing unit 134 when loading and executing program code of the FTL 450. Details are described as follows:

Step S710: A triggering signal is detected. The triggering signal may indicate that the device side is going to enter the sleep mode, it has reached the preset time point, or other preset condition has been met.

Step S720: The erase counter value corresponding to the first or the next data block in the SLC region 155 #1, which represents the number of times this data block has been erased, is read.

Step S730: It is determined whether the erase counter value is higher than the threshold. If so, it means that the use of this data block is more frequent, and the process proceeds to step S740. Otherwise, it means that the use of this data block is normal, and the process proceeds to step S750.

Step S740: This data block is labeled as a migration-source block. The FTL 450 may record the labeling information in the RAM 136.

Step S750: It is determined whether all data blocks in the SLC region 155 #1 has been detected completely. If so, the process proceeds to step S760. Otherwise, the process proceeds to step S720.

Step S760: The data migration process is performed.

In some embodiments of the data migration process recited in step S760, the FTL 450 may drive the flash I/F 139 to migrate data stored in multiple physical pages of the migrate-source block, which belong to the second partition type, in the SLC region 155 #1 to one physical page of one current block in the non-SLC region 155 #3, where the physical page of the current block is programmed in the MLC, TLC or QLC mode, and the number of erasures of the current block is relatively low in the non-SLC region 155 #3. Additionally, the FTL 450 may drive the flash I/F 139 to migrate data stored in each physical page of the migrate-source block, which belongs to the first partition type, in the SLC region 155 #1 to one physical page of one current block in the SLC region 155 #1, where the physical page of the current block is programmed in the SLC mode, and the number of erasures of the current block is relatively low in the SLC region 155 #1. It is to be noted that, when the data migration process programs data of two, three or four physical pages of the migration-source block into one non-SLC page in the non-SLC region 155 #3 in the MLC, TLC or QLC mode, it releases storage space of two or more physical pages (i.e. SLC pages) in the SLC region 155 #1.

In alternative embodiments of the data migration process recited in step S760, the FTL 450 may drive the flash I/F 139 to collect valid data stored in multiple physical pages of the migrate-source block, which belong to the second partition type, in the SLC region 155 #1 and program the collected data into one physical page of one current block in the non-SLC region 155 #3 in the MLC, TLC or QLC mode, where the number of erasures of the current block is relatively low in the non-SLC region 155 #3. Additionally, the FTL 450 may drive the flash I/F 139 to collect valid data stored in multiple physical pages of the migrate-source block, which belong to the first partition type, in the SLC region 155 #1 and program the collected data into one physical page of one current block in the SLC region 155 #1 in the SLC mode, where the number of erasures of the current block is relatively low in the SLC region 155 #1. In this way, not only the purpose of wear leveling is achieved, but also the GC process is performed, and the storage space of flash module 150 would be used more effectively.

In the data migration process recited in step S760, after the data of the migration-source blocks is programmed into non-SLC region 155 #3, the FTL 450 may mark the migration-source blocks as ones that cannot be used temporarily to avoid they become spare blocks after being erased in a short time.

Figure 8:
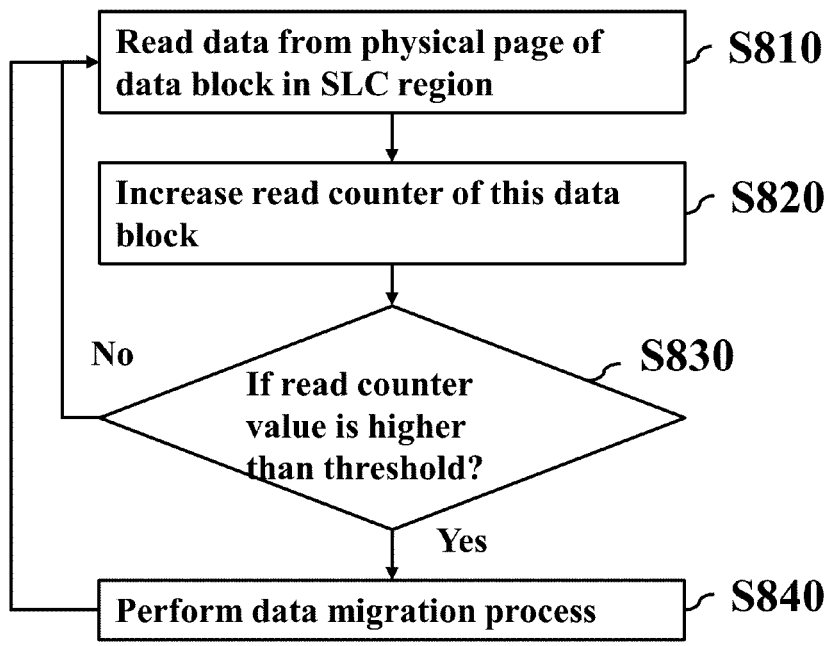
FIG. 8 is a flowchart illustrating a method for cross-region read refresh according to an embodiment of the invention.

In order to prevent the data stored in physical blocks in the SLC region 155 #1 from being damaged due to excessive read times, the FTL 450 may perform a data migration procedure at proper time points. The FTL 450 may provide a read counter for each physical block, which is set to zero after the physical block becomes a spare block or is erased. After data is read from a physical block each time, the corresponding read counter is increased by one. Refer to FIG. 8 showing the flowchart of a method for cross-region read refresh, which is performed by the processing unit 134 when loading and executing program code of the FTL 450. Details are described as follows:

Step S810: Data is read from a physical page of a data block in the SLC region 155 #1.

Step S820: The read counter of the data block is increased by one.

Step S830: It is determined whether the read counter value of the data block is higher than the threshold. If so, it means that this data block has been read too much, and the process proceeds to step S840. Otherwise, it means that the use of this data block is normal, and the process proceeds to step S810.

Step S840: The data migration process is performed.

In some embodiments of the data migration process recited in step S840, the FTL 450 may drive the flash I/F 139 to migrate data stored in multiple physical pages of this data block, which belong to the second partition type, to one physical page of one current block in the non-SLC region 155 #3, where the physical page of the current block is programmed in the MLC, TLC or QLC mode. Additionally, the FTL 450 may drive the flash I/F 139 to migrate data stored in each physical page of this data block, which belongs to the first partition type, to one physical page of one current block in the SLC region 155 #1, where the physical page of the current block is programmed in the SLC mode. It is to be noted that, when the data migration process programs data of two, three or four physical pages of this data block into one non-SLC page in the non-SLC region 155 #3 in the MLC, TLC or QLC mode, it releases storage space of two or more physical pages (i.e. SLC pages) in the SLC region 155 #1.

In alternative embodiments of the data migration process recited in step S840, the FTL 450 may drive the flash I/F 139 to collect valid data stored in multiple physical pages of this data block, which belong to the second partition type, and program the collected data into one physical page of one current block in the non-SLC region 155 #3 in the MLC, TLC or QLC mode. Additionally, the FTL 450 may drive the flash I/F 139 to collect valid data stored in multiple physical pages of this data block, which belong to the first partition type, and program the collected data into one physical page of one current block in the SLC region 155 #1 in the SLC mode. In this way, not only the purpose of read refresh is achieved, but also the GC process is performed, and the storage space of flash module 150 would be used more effectively.

Figure 9:
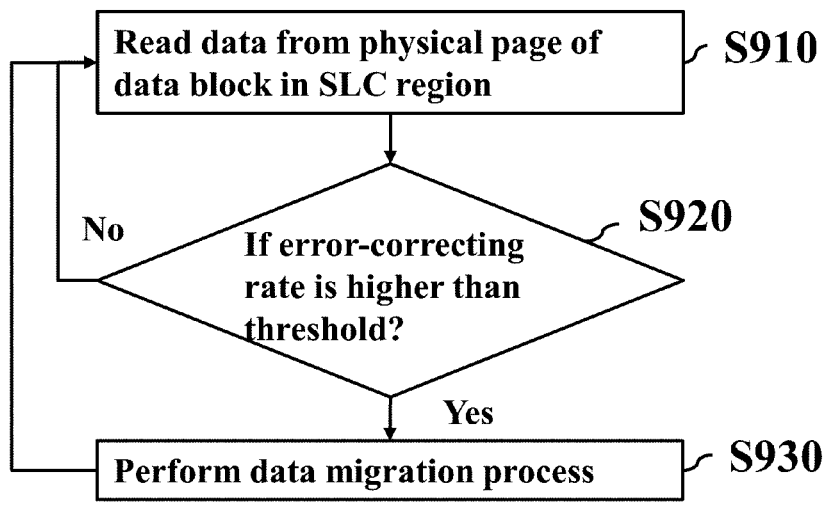
FIG. 9 is a flowchart illustrating a method for cross-region read reclaim according to an embodiment of the invention.

Moreover, when the read disturbance occurs in a data block due to several reasons, the data stored therein may contain too many error bits. When detecting one or more physical pages in a data block contains too many error bits, the FTL 450 may perform a data migration procedure at proper time points. Refer to FIG. 9 showing the flowchart of a method for cross-region read reclaim, which is performed by the processing unit 134 when loading and executing program code of the FTL 450. Details are described as follows:

Step S910: Data is read from physical pages of a data block in the SLC region 155 #1.

Step S920: It is determined whether the error-correcting rate of the data block is higher than the threshold. If so, it means that the read disturbance may occur in this data block, and the process proceeds to step S930. Otherwise, it means that the use of this data block is normal, and the process proceeds to step S910. During the data reading, the flash I/F 139 may use the corresponding error-correcting code (ECC) to correct error bits in the data read from this data block. The ECC may be Low-Density Parity Check Code (LDPC), Bose-Chaudhuri-Hocquenghem (BCH) code, or others. Taking 1 KB user data as an example, BCH code can be used to correct at most 72 error bits while LDPC can be used to correct at most 128 error bits. The threshold may be set to 50% to 80% of the maximum error-correcting capability of the used ECC.

Step S930: The data migration process is performed. Regarding the technical details of the data migration process recited in step S930, those artisans may infer them from the description of step S840, and will not be repeated for brevity.

In the data migration process recited in steps S760, S840 and S930, in order to determine whether data stored in each physical page of a migration-source block in the SLC region 155 #1 belongs to the first or second partition type, the FTL 450 may search the partition-type bit table corresponding to the migration-source block to obtain that information.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged to operably perform the aforementioned operations. While the process flows described in FIGS. 5 to 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for storing data in flash memory, performed by a device side processing unit responsive to loading and executing program code, the method comprising:

receiving logical partitioning information describing a first logical partition type and a second logical partition type of storage from a file system run on a host side, wherein the logical partitioning information comprises a first length of the first logical partition type of storage and a second length of the second logical partition type of storage, the first length of the first logical partition type and the second length of the second logical partition type are represented by quantities of logical block address (LBA) numbers, the host side defines the first logical partition type and the second logical partition type, the host side defines to store a first type of files in the first logical partition type of storage, and the host side defines to store a second type of files in the second logical partition type of storage;

dividing storage space in a flash module into a first region and a second region, wherein the first region comprises a plurality of first physical blocks, the second region comprises a plurality of second physical blocks, each first physical block is programmed in a single level cell (SLC) mode only, each second physical block is programmed in the SLC mode or a non-SLC mode, the SLC mode is used to program a memory cell to store one of two states, and the non-SLC mode is used to program a memory cell to store one of at least four states;

programming data belonging to the first logical partition type, which is received from the host side, into a first physical block in the first region only;

programming data belonging to the second logical partition type, which is received from the host side, into either the first physical block in the first region or a second physical block in the second region;

reading data from a physical page of a data block in the first region, wherein the data block comprises the first physical block which has been fully programmed;

examining a status for the first region;

in response to the status for the first region meeting a condition, reading and collecting data stored in a plurality of first valid sectors of the data block, which belongs to the first logical partition type, and programming first collected data into a first current block in the first region in the SLC mode; and in response to the status for the first region meeting the condition, reading and collecting data stored in a plurality of second valid sectors of the data block, which belongs to the second logical partition type, and programming second collected data into a second current block in the second region in the non-SLC mode, wherein a current block comprises a spare block selected for storing data, wherein the status for the first region meeting the condition comprises an error-correcting rate of the data block being higher than a threshold.

2. The method of claim 1, comprising:

receiving a host write command from the host side;

in response to the host write command requesting to program first data belonging to the first logical partition type, programming the first data into a current block in the first region;

in response to the host write command requesting to program second data belonging to the second logical partition type and the host write command is a random write command, programming the second data into a current block in the first region; and in response to the host write command requesting to program third data belonging to the second logical partition type and the host write command is a continuous write command, programming the third data into a current block in the second region.

3. The method of claim 2, wherein a length of the second data is shorter than a length of one physical page, and a length of the third data is equal to or longer than a length of one physical page.

4. The method of claim 2, comprising:

examining a partition number carried in the host write command to determine whether requested data to be written belongs to the first logical partition type or the second logical partition type.

5. The method of claim 1, wherein the status for the first region meeting the condition comprises a total number of spare blocks in the first region being lower than a threshold.

6. The method of claim 1, wherein the status for the first region meeting the condition comprises an erase count or a read count corresponding to the data block in the first region being higher than a threshold.

7. The method of claim 6, comprising:

searching a partition-type bit table to obtain information indicating that the first physical pages of the data block correspond to the first logical partition type, and the second physical pages of the data block correspond to the second logical partition type, wherein the partition-type bit table comprises a plurality of bits, and each bit records information indicating that the data in a corresponding physical page belongs to the first logical partition type or the second logical partition type.

8. A non-transitory computer-readable storage medium having stored therein program code that, when loaded and executed by a processing unit of a device side, causes the processing unit to:

receive logical partitioning information describing a first logical partition type and a second logical partition type of storage from a file system run on a host side, wherein the logical partitioning information comprises a first length of the first logical partition type of storage and a second length of the second logical partition type of storage, the first length of the first logical partition type and the second length of the second logical partition type are represented by quantities of logical block address (LBA) numbers, the host side defines the first logical partition type and the second logical partition type, the host side defines to store a first type of files in the first logical partition type of storage, and the host side defines to store a second type of files in the second logical partition type of storage;

divide storage space in a flash module into a first region and a second region, wherein the first region comprises a plurality of first physical blocks, the second region comprises a plurality of second physical blocks, each first physical block is programmed in a single level cell (SLC) mode only, each second physical block is programmed in the SLC mode or a non-SLC mode, the SLC mode is used to program a memory cell to store one of two states, and the non-SLC mode is used to program a memory cell to store one of at least four states;

program data belonging to the first logical partition type, which is received from the host side, into a first physical block in the first region only;

program data belonging to the second logical partition type, which is received from the host side, into either the first physical block in the first region or a second physical block in the second region;

read data from a physical page of a data block in the first region, wherein the data block comprises the first physical block which has been fully programmed;

examine a status for the first region;

in response to the status for the first region meeting a condition, read and collect data stored in a plurality of first valid sectors of the data block, which belongs to the first logical partition type, and program first collected data into a first current block in the first region in the SLC mode; and in response to the status for the first region meeting the condition, read and collect data stored in a plurality of second valid sectors of the data block, which belongs to the second logical partition type, and program second collected data into a second current block in the second region in the non-SLC mode, wherein a current block comprises a spare block selected for storing data, wherein the status for the first region meets the condition when an error-correcting rate of the data block is higher than a threshold.

9. The non-transitory computer-readable storage medium of claim 8, wherein the program code that, when loaded and executed by the processing unit, causes the processing unit to:

receive a host write command from the host side;

in response to the host write command requesting to program first data belonging to the first logical partition type, program the first data into a current block in the first region;

in response to the host write command requesting to program second data belonging to the second logical partition type and the host write command is a random write command, program the second data into a current block in the first region; and in response to the host write command requesting to program third data belonging to the second logical partition type and the host write command is a continuous write command, program the third data into a current block in the second region.

10. The non-transitory computer-readable storage medium of claim 8, wherein the status for the first region meets the condition when a total number of spare blocks in the first region is lower than a threshold.

11. The non-transitory computer-readable storage medium of claim 8, wherein the status for the first region meets the condition when an erase count or a read count corresponding to the data block in the first region is higher than a threshold.

12. An apparatus for storing data in flash memory, equipped with a device side, comprising:
- a flash interface (I/F), coupled to a flash module;
- a host I/F, coupled to a host side; and
- a processing unit, coupled to the flash OF and the host I/F, arranged operably to receive logical partitioning information describing a first logical partition type and a second logical partition type of storage from a file system run on a host side, wherein the logical partitioning information comprises a first length of the first logical partition type of storage and a second length of the second logical partition type of storage, the first length of the first logical partition type and the second length of the second logical partition type are represented by quantities of logical block address (LBA) numbers, the host side defines the first logical partition type and the second logical partition type, the host side defines to store a first type of files in the first logical partition type of storage, and the host side defines to store a second type of files in the second logical partition type of storage; divide storage space in the flash module into a first region and a second region, wherein the first region comprises a plurality of first physical blocks, the second region comprises a plurality of second physical blocks, each first physical block is programmed in a single level cell (SLC) mode only, each second physical block is programmed in the SLC mode or a non-SLC mode, the SLC mode is used to program a memory cell to store one of two states, and the non-SLC mode is used to program a memory cell to store one of at least four states; drive the flash OF to program data belonging to the first logical partition type, which is received from the host side through the host I/F, into a first physical block in the first region only; drive the flash OF to program data belonging to the second logical partition type, which is received from the host side, into either the first physical block in the first region or a second physical block in the second region; drive the flash OF to read data from a physical page of a data block in the first region, wherein the data block comprises the first physical block which has been fully programmed; examine a status for the first region; in response to the status for the first region meeting a condition, drive the flash OF to read and collect data stored in a plurality of first valid sectors of the data block, which belongs to the first logical partition type, and program first collected data into a first current block in the first region in the SLC mode; and in response to the status for the first region meeting the condition, drive the flash OF to read and collect data stored in a plurality of second valid sectors of the data block, which belongs to the second logical partition type, and program second collected data into a second current block in the second region in the non-SLC mode, wherein a current block comprises a spare block selected for storing data, wherein the status for the first region meets the condition when an error-correcting rate of the data block is higher than a threshold.

13. The apparatus of claim 12, wherein the processing unit is arranged operably to receive a host write command from the host side through the host I/F; in response to the host write command requesting to program first data belonging to the first logical partition type, drive the flash I/F to program the first data into a current block in the first region; in response to the host write command requesting to program second data belonging to the second logical partition type and the host write command is a random write command, drive the flash I/F to program the second data into a current block in the first region; and in response to the host write command requesting to program third data belonging to the second logical partition type and the host write command is a continuous write command, drive the flash I/F to program the third data into a current block in the second region.

14. The apparatus of claim 13, wherein a length of the second data is shorter than a length of one physical page, and a length of the third data is equal to or longer than a length of one physical page.

15. The apparatus of claim 13, wherein the processing unit is arranged operably to examine a partition number carried in the host write command to determine whether requested data to be written belongs to the first logical partition type or the second logical partition type.

16. The apparatus of claim 12, wherein the status for the first region meets the condition when a total number of spare blocks in the first region is lower than a threshold.

17. The apparatus of claim 12, wherein the status for the first region meets the condition when an erase count or a read count corresponding to the data block in the first region is higher than a threshold.

* * * * *